Sept. 22, 1970  G. J. KEENAN  3,529,726

PORTABLE WATER FILTER UNIT

Filed Sept. 15, 1969

INVENTOR.
GORDON J. KEENAN

BY

*Shlesinger, Fitzsimmons and Shlesinger*

ATTORNEYS

United States Patent Office 3,529,726
Patented Sept. 22, 1970

3,529,726
PORTABLE WATER FILTER UNIT
Gordon J. Keenan, 579 Hurstbourne Road,
Rochester, N.Y. 14609
Filed Sept. 15, 1969, Ser. No. 857,937
Int. Cl. B01d 27/02
U.S. Cl. 210—232          1 Claim

ABSTRACT OF THE DISCLOSURE

A supply of activated, granular charcoal is secured in the bore of a cylindrical filter cartridge between axially spaced porous filter elements, which are secured transversely across the bore at points equi-spaced inwardly from opposite ends of the cartridge. The cartridge is removably fastened between two, spaced, rectangular end plates by four tie bolts, which extend along the outside of the cartridge between the plates. In its center each plate has a nipple communicating with one end of the bore in the cartridge. Flexible tubing connects one nipple to a conventional rubber coupling, which is releasably fastenable to a water faucet to supply water to one end of the cartridge bore, and the other nipple is adapted to be connected by tubing to a refrigerator bottle, or the like, for storing filtered water. The cartridge is symmetrically constructed so that water may be passed therethrough in either direction.

---

This invention relates to filters, and more particularly to a portable, countertop-type filter unit, which is releasably attachable to tap water faucets, or the like, to remove undesirable odors, tastes, etc., from drinking water.

Pollution of drinking water sources has become a serious problem in recent years. Greater quantities of chlorine are required to make water safe for drinking purposes. By the time drinking water reaches a household faucet, the chlorine has accomplished its purpose, and is no longer needed to purify the water. Often, however, excess chlorine remains in the water and causes it to have an unpleasant taste and/or odor.

Moreover, increased use of artificial fertilizers, and the rise in sewage pollution, have resulted in a great increase in the nutrient level of our lakes and streams. Nutrients accelerate the growth of algae, thus creating many water processing problems. Even though all the algae growth is removed from average drinking water before it reaches the consumer, it can still leave the water with an unpleasant taste.

These problems are quite common even to the home serviced by large municipal or other such water authorities, which employ rather sophisticated equipment for extensively filtering and purifying drinking water before distributing it to consumers. Of course in the case of home owners who must rely upon local wells for their drinking water, the problem of foreign tastes, odors and particles in the drinking water as it reaches the household tap is even greater. Although in many, if not most instances, these undesirable tastes or odors are of little consequence if the water is to be used for purposes other than drinking, it is nevertheless most desirable that they be removed if the water is to be used for drinking and/or cooking food.

It is an object of this invention, therefore, to provide a relatively small, compact water filter unit that can be readily and releasably attached to a conventional household water faucet to remove undesirable odors, tastes, and foreign matter from the tap water.

Another object of this invention is to provide a countertop-type water filter, which, when not in use, can be readily removed from a faucet and stored conveniently nearby.

A further object of the invention is to provide a filter unit of the type described, which uses a removable filter cartridge that can be readily removed and replaced when necessary.

Other objects of the invention will be apparent hereinafter from the specification and from the recital of the appended claim, particularly when read in conjunction with the accompanying drawing.

Figure 1:
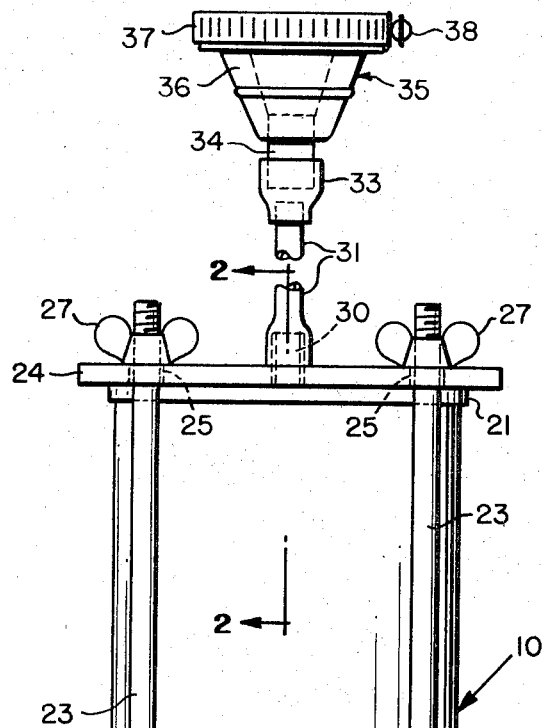
FIG. 1 is a fragmentary elevational view of a filter unit made in accordance with one embodiment of this invention, a portion of the cartridge that forms part of this unit being broken away for purposes of illustration.
Figure 2:
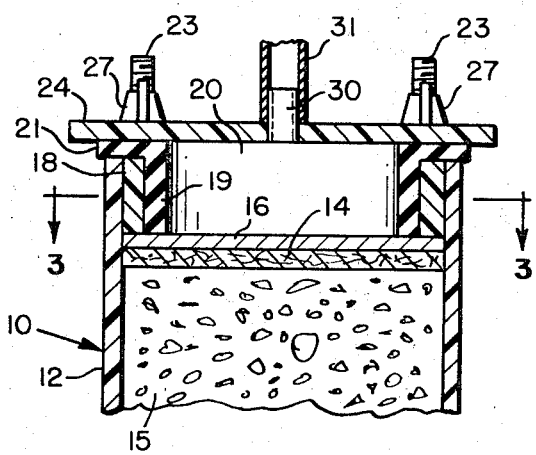
FIG. 2 is a fragmentary sectional view taken along the line 2—2 in FIG. 1 looking in the direction of the arrows.
Figure 3:
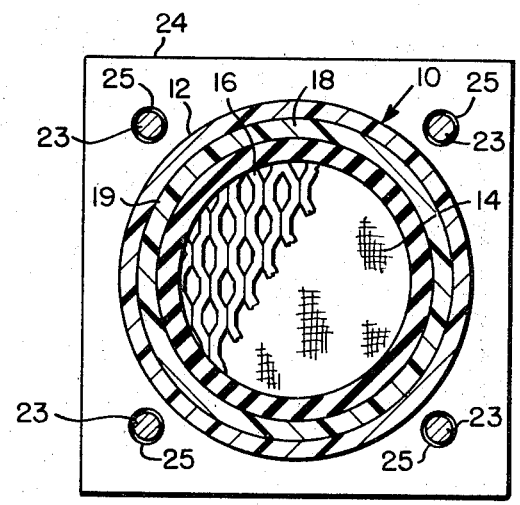
FIG. 3 is a fragmentary sectional view taken along the line 3—3 in FIG. 2 looking in the direction of the arrows, and illustrating the interior of the removable filter cartridge, which forms part of this unit.

Referring now to the drawing by numerals of reference, 10 denotes generally a cylindrical filter cartridge, which forms part of the filter unit made in accordance with this invention. Cartridge 10 comprises an outer tubular casing 12 made from, for example, a rigid plastic such as polyvinyl chloride tubing. Mounted in the casing 12 between two axially spaced felt discs 14 is a supply of activated granular charcoal 15. Seated coaxially against the outside faces of the discs 14 in opposite ends of the casing 12 are two axially spaced, disc-shaped wire grills or screens 16, which are made of corrosion resistant metal such as brass or aluminum.

Press-fit into each end of the casing 12 coaxially thereof is a plastic spacer ring 18, which may be made of polyethylene or the like. At their inner ends the rings 18 engage the marginal edges of the grills 16 to secure the grills, the adjacent discs 14, and the charcoal supply 15 against axial movement in the casing.

Press-fit into the bores of the rings 18 at opposite ends, respectively, of cartridge 10 are two, annular, rubber bushings or end seals 19. Each seal 19 has an axial bore 20, and at its outer end has an external, circumferential flange 21, which overlies the outer end of the surrounding spacer ring 18, and the adjacent end of casing 12. The inner end of each seal 19 seats against the outer face of the adjacent grill 16; and each flange portion 21 has an outside diameter slightly greater than the outside diameter of casing 12.

Removably fastened over opposite ends of the cartridge 10 by four aluminum tie rods 23 are two, identical, square end plates 24, each of which is slightly larger than the casing 12 so that the corners of the plates project outwardly beyond the casing. The tie rods 23, which extend along the outside of the casing 12 from the corners of one plate 24 to corresponding corners of the other plate, are removably mounted adjacent opposite ends thereof in registering openings 25 formed in plates 24 adjacent the corners thereof. Secured to the lower end of each rod 23 to engage the underside of the lower end plate 24 is a headed nut 26. Threaded onto the upper ends of the tie rods 23 above the upper end plate 24 are conventional wing nuts 27, which serve to draw the end plates 24 snugly and sealingly over the outer, flanged ends of the rubber end seals 19.

Fixed at its lower end in a central opening in the upper end plate 24, and projecting slightly above this plate, is a plastic nipple 30. Press fit at its lower end over the upper end of nipple 30 is a length of rubber or plastic tubing 31. The opposite end of this tubing is connected by a rubber nipple or sleeve 33 to a tubular nipple or ferrule 34 that projects from the lower end of a conventional rubber faucet connector or fitting 35. This fitting includes a hollow, rubber coupling 36, which is generally inverted truncated-conical in configuration. The upper end of coupling 36 is surrounded by a conventional stainless steel clamp 37, including a manually operable thumb screw 38 for releasably fastening the connector 35 to a conventional faucet.

Fastened at its upper end in a central opening in the lower end plate 24, and projecting downwardly from this plate, is a further nipple 40. The lower end of nipple 40 is connected to one end of a length of flexible rubber or plastic tubing 42, which is used to convey filtered water from the cartridge 10 in a manner described below.

In use, the upper end of the connector 35 is inserted over the tap or outlet end of a conventional water faucet; and, if necessary, the screw 38 is adjusted securely to fasten the connector to the faucet. The cartridge 10 may then be supported horizontally on a nearby shelf, or the like, with registering edges of the two end plates 24 lying flat on the shelf so that the cartridge will not tend to roll or tip over. The outlet end of tubing 42 is then inserted, for example, into a refrigerator storage bottle, or the like; and the faucet is turned on so that water therefrom passes through the connector 35, tubing 31, the nipple 30 and the bore 20 in the adjacent seal 19 into the interior of the cartridge 10. This water then passes successively through one of the grills 16 (the upper grill in FIG. 1 in the embodiment illustrated) the adjacent felt disc 14, then through the charcoal supply 15, the other felt disc 14 and the grill 16 located at the opposite end of the cartridge, and then through the nipple 40 and tubing 42 to the bottle. The discs 16 and 14 thus filter out undesirable particles from the water passing through the cartridge; and the activated charcoal 15 removes foreign odors and tastes.

This process continues until the bottle is filled, after which the faucet may be turned off and the connector 35 removed; or one or more additional bottles may be filled before the connector is removed. When the connector 35 is finally removed from the faucet, the entire unit may be stored in a cupboard or the like, until it is again necessary to replenish the drinking water supply.

After repeated use, for example, after filtering approximately 100 gallons of water, it may be desirable to replace the filter cartridge 10. This may be done merely by loosening the wing nuts 27 of two adjacent screws, and completely removing the nuts 27 from the remaining two screws, so that the end plates 24 may be separated slightly, and so that said two remaining screws can be removed from end plates 24 to form an opening through which the cartridge 10 can be removed laterally from between the loose plates 24. The old cartridge 10 may then be replaced by a new one, after which the end plates 24 are positioned over opposite ends of the new cartridge; and the two previously-removed screws 23 are reinserted into the end plates, and wing nuts 27 are again threaded snugly onto the tie rods to secure the new cartridge in place. Since each cartridge is symmetric about its midpoint, it makes no difference which end of the new cartridge 10 is placed against the lower end plate 24, and it makes no difference in which direction water flows through a given cartridge. However, once a cartridge has been used, it is not advisable to reverse the direction of water flow through the cartridge.

As shown in FIG. 1, the tubing 31 has a smaller outside diameter than the ferrule 34 that projects from the lower end of the connector 35. The upper end of the sleeve or nipple 33, therefore, is under greater tension around the ferrule 34 than it is around the upper end of the tubing 31. If, therefore, the faucet to which the connector 35 is attached is suddenly and accidentally opened too far, so that excessive back pressure is built up by the water between the filter cartridge 10 and the connector 35, the pressure will cause the upper end of the tubing 31 to be forced out of the lower end of the nipple 33, thereby relieving the back pressure and preventing accidental rupture of the rubber connector 35.

The felt discs 14 can be made from a synthetic material such as rayon or Dacron; but in any event must be made from a material which is extremely mildew resistant with respect to water. Since the flanged portion 21 of each end seal 19 has an outside diameter slightly larger than the outside diameter of the casing 12, its peripheral surface extends slightly beyond the periphery of the casing, thereby assuring a waterproof seal between the casing and the plates 24.

From the foregoing it will be apparent that applicant has developed a relatively simple, compact, and inexpensive filter unit which is particularly useful for home-use in removing undesirable tastes, odors, etc. from otherwise potable drinking water. The unit is particularly adapted for use with a conventional faucet connector, so that it may be readily and easily attached to differently sized water taps. Moreover, when the filter cartridge 10 of the unit becomes dirty, it may be readily replaced by removing only two of the screws 23 from the end plates 24; and the new cartridge may be inserted readily without regard to which end thereof will be positioned to face the water tap. Cartridge replacement requires no special tools, and requires no special skill, other than the ability to loosen the wing nuts 27 and remove two screws 23 to permit the old cartridge to be removed laterally from between the loosened end plates 24. This simplified operation is possible because the confronting surfaces of the end plates 24 and the adjacent end seals 19 at each end of the unit are coplanar, when assembled, and have no interlocking surfaces which will require complete removal of an end plate in order to release a cartridge for removal from the unit.

Having thus described my invention, what I claim is:

1. A filter for fluids, comprising
a hollow, cylindrical filter cartridge having a central bore,
a pair of end plates positioned over and closing opposite ends of the bore in said cartridge, the marginal edge portions of said plates projecting outwardly beyond the outer peripheral surface of said cartridge,
porous filter material secured in said bore in said cartridge between said end plates,
each of said plates having therethrough an opening communicating with said filter material,
a length of flexible tubing connected at one end to one of said openings, and having means on the opposite end thereof for connecting said tubing with a supply of fluid under pressure,
a plurality of parallel tie rods extending axially along the outside of said cartridge and projecting at opposite ends thereof releasably through registering openings in the outwardly projecting portions of said end plates,
means fastened to opposite ends of said rods and engageable with the outer surfaces of said end plates securely to fasten said plates against opposite ends of said cartridge,
the last-named means comprising a plurality of nuts releasably threaded on said rods at one end thereof,
said rods being angularly spaced about the axis of said cartridge in such manner that upon the loosening of all said nuts, and the removal of less than all of said rods from said end plates, said cartridge can be removed laterally from between said plates,
said means for connecting said tubing to said fluid supply comprising a rubber coupling attachable at one end to a faucet, and having a nipple projecting from the opposite end thereof,
said opposite end of said tubing being connected by a resilient, flexible sleeve to said nipple,
said nipple and said opposite end of said tubing projecting snugly and frictionally into opposite ends of said sleeve, the outside diameter of said nipple being greater than the outside diameter of said tubing, whereby upon the development of excessive fluid pressure in said tubing the latter will slip out of said sleeve to relieve the pressure, said porous filter material comprising two axially spaced layers of felt positioned transversely across the bore in said cartridge adjacent opposite ends thereof, respectively, a supply of activated charcoal granules filling the axial space in said casing between said layers of felt, and two layers of metal screen positioned in the bore of said cartridge against the outside faces of said layers of felt, said layers of felt and screening being axially spaced inwardly from two opposite ends of said cartridge, a pair of rigid plastic rings press fit in opposite ends, respectively, of the bore in said cartridge with their inner ends engaged with said layers of screen to secure said layers and said charcoal granules against axial movement in said bore of said cartridge, a pair of resilient annular seals projecting snugly through the bores in said rings and into contact with said layers of screen at opposite ends, respectively, of said cartridge, and each of said seals having on its outer end a circumferential flange projecting between the adjacent end of said cartridge and the end plate secured thereover.

References Cited

UNITED STATES PATENTS

| | | | |
|---|---|---|---|
| 433,710 | 8/1890 | Aims | 210—266 X |
| 565,972 | 8/1896 | Fowler | 210—447 X |
| 1,680,323 | 8/1928 | Culver | 210—450 X |
| 2,041,043 | 5/1936 | Bennett | 210—446 |
| 2,325,657 | 8/1943 | Burkness | 210—448 X |
| 3,342,340 | 9/1967 | Shindell | 210—282 |
| 3,439,809 | 4/1969 | McPherren | 210—282 X |

SAMIH N. ZAHARNA, Primary Examiner

U.S. Cl. X.R.

210—266, 282, 447